US 6,614,928 B1

(12) United States Patent
Chung et al.

(10) Patent No.: US 6,614,928 B1
(45) Date of Patent: Sep. 2, 2003

(54) AUTOMATIC PARCEL VOLUME CAPTURE SYSTEM AND VOLUME CAPTURE METHOD USING PARCEL IMAGE RECOGNITION

(75) Inventors: Yoon Su Chung, Taejon (KR); Hee Jeong Cheong, Seoul (KR); Jin Seog Kim, Taejon (KR); In So Kweon, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/495,741

(22) Filed: Feb. 1, 2000

(30) Foreign Application Priority Data

Dec. 21, 1999 (KR) ........................................ 1999-59969

(51) Int. Cl.[7] .................................................. G06K 9/00
(52) U.S. Cl. ......................... 382/154; 382/143; 356/627
(58) Field of Search ................................. 382/143, 154; 356/627

(56) References Cited

U.S. PATENT DOCUMENTS

| 5,184,733 A | * | 2/1993 | Arnarson et al. .................. 177/1 |
| 5,331,118 A | * | 7/1994 | Jensen ........................ 177/245 |
| 5,638,116 A |  | 6/1997 | Shimoura et al. ............. 348/118 |
| 5,699,161 A | * | 12/1997 | Woodworth ................. 356/628 |
| 5,719,678 A | * | 2/1998 | Reynolds et al. ............ 235/383 |
| 5,872,858 A |  | 2/1999 | Kamada et al. ............... 382/107 |
| 5,880,844 A | * | 3/1999 | Seng ............................ 356/613 |
| 6,061,645 A | * | 5/2000 | Bengala et al. .......... 250/559.22 |
| 6,125,197 A | * | 9/2000 | Mack et al. ..................... 256/12 |

OTHER PUBLICATIONS

L. Toth et al., "3D object recognition from static 2D views using multiple coarse data channels," Image Vision Computing. pp. 1–14: 1999.

* cited by examiner

Primary Examiner—Leo Boudreau
Assistant Examiner—Shefali Patel
(74) Attorney, Agent, or Firm—Seed IP Law Group PLLC

(57) ABSTRACT

An automatic parcel volume capture system and an automatic parcel volume capture method are provided. An automatic parcel volume capture system in accordance with an embodiment of the present invention includes stereo image input means, image processing means, feature extraction means, and volume measurement means. The stereo image input means captures images of an object from at least two different angles. The image processing means performs signal-processing on the images captured by the stereo image input means and extracts region of object in the images. The feature extraction means extracts lines and cross points of the lines from results of the image processing means. The volume measurement means generates three dimensional model on the basis of the extracted images and measures volume of the object.

19 Claims, 4 Drawing Sheets

AUTOMATIC PARCEL VOLUME CAPTURE SYSTEM AND VOLUME CAPTURE METHOD USING PARCEL IMAGE RECOGNITION

TECHNICAL FIELD

The present invention relates to an automatic parcel volume capture system and a volume capture method using parcel image recognition. In particular, the automatic parcel volume capture system and the volume capture method utilize image recognition techniques to extract feature of a parcel and measure accurate volume of it.

BACKGROUND OF THE INVENTION

Conventional volume measurement systems have employed cameras or laser devices. Light curtain technology and PILAR (Parallel Infrared Laser Rangefinder) use laser devices. On the other hand, a method using two still images, one side view and the other front view, utilizes cameras.

The method with laser devices is usually used for recognizing moving objects and this method requires large cost for equipments. In the method with cameras, objects to be recognized are very sensitive with lighting variation, which actually affects image processing and feature extraction for parcel image recognition. Therefore, this method with camera is not appropriate for parcel image recognition because the environment processing parcels is not good enough. And if shape of the parcel is not rectangular in the method with two images, efficiency of recognition is deteriorated.

Conventional volume measurement systems have employed edge detection techniques such as Sobel operator to recognize edges of input images and the edge detection techniques are basically based upon difference between adjacent pixels in terms of brightness. However, if variation of brightness in an image is big, the conventional volume measurement systems are not able to detect edges efficiently and therefore error of volume measurement increases.

SUMMARY OF THE INVENTION

An automatic parcel volume capture system and an automatic parcel volume capture method are provided. An automatic parcel volume capture system in accordance with an embodiment of the present invention includes stereo image input means, image processing means, feature extraction means, and volume measurement means. The stereo image input means captures images of an object from at least two different angles. The image processing means performs signal-processing on the images captured by the stereo image input means and extracts region of object in the images. The feature extraction means extracts lines and cross points of the lines from results of the image processing means. The volume measurement means generates three dimensional model on the basis of the extracted images and measures volume of the object.

Preferably, the automatic parcel volume capture system further includes volume storage means for storing volume of the object measured by the volume measurement means.

Preferably, the stereo image input means includes image capturing means and image preprocessing means. The image capturing means captures images of the object from at least two different angles. The image preprocessing means averages the captured images and removes noises.

Preferably, the image capturing means is a charge coupled device (CCD) camera.

Preferably, the image processing means includes edge detecting means and region extracting means. The edge detecting means detects all edges in the captured images. The region extracting means extracts object region by comparing background image with object image in reference to the detected edges.

Preferably, the feature extraction means includes line extracting means and feature point extracting means. The line extracting means extracts lines of an object from result of the image processing means. The feature point extracting means extracts crossing points of an object by finding intersection points of the extracted lines.

Preferably, the volume measurement means includes matched junction capturing means, three dimensional model generating means, and volume calculating means.

The matched junction capturing means matches same crossing points among crossing points captured from the image. The three dimensional model generating means generates three dimensional model of an object on the basis of the matched junction captured by the matched junction capturing means. The volume calculating means calculates volume of the object on the basis of the three dimensional model.

Preferably, the volume measurement means further includes error minimizing means for compensating error of the three dimensional model generated by the three dimensional model generating means.

An automatic parcel volume capture method in accordance with an embodiment of the present invention includes stereo image input step, image processing step, feature extraction step, and volume measurement step. The stereo image input step captures images of an object from at least two different angles. The image processing step performs signal-processing on the images captured at the stereo image input step and extracts region of object in the images. The feature extraction step extracts lines and crossing points of the lines from results of the image processing step. The volume measurement step generates three dimensional model on the basis of the extracted images and measures volume of the object.

Preferably, the volume storage step stores volume of the object measured by the volume measurement step.

Preferably, the stereo image input step includes image capturing step and image preprocessing step. The image capturing step captures images of the object from at least two different angles. The image preprocessing step averages the captured images and removes noises.

Preferably, the image preprocessing step includes following steps. First step covers a W×W window around a current pixel x in N×N input image. Second step calculates local average and variation regarding all pixels in the window. Third step applies the average and the variation to the following equation 1 for MDIM (Mean difference Dynamic Image Model) and applies the average and the variation to the following equation 2 for NDIM (Normalized Dynamic Image Model). Fourth step repeats the first step to third step with increasing the current pixel x up to N×N sequentially.

$$I_{m2}(x+\delta x) = \alpha(x) \cdot I_{m1}(x), \text{ where } I_{mi}(x) = I_i(x) - m_i(x) \quad \text{[Equation 1]}$$

$$I_{ms2}(x+\delta x) = I_{ms1}(x), \text{ where } I_{msi}(x) = (I_i(x) - m_i(x))/S_1(x) \quad \text{[Equation 2]}$$

x: position of the current pixel
$I_i(x)$: brightness of x
$\alpha(x)$: local brightness changing component
$S_1(x)$: square value of the local variation $m_i(x)$: local average of x $\overline{I_{mi}}(x)$: difference between brightness of x $I_f(x)$ and local average of x $m_i(x)$ $I_{msi}(x)$: $I_{mi}(x)$ divided by $S_f(x)$ Preferably, the image processing step includes edge detecting step and region extracting step. The edge detecting step detects all edges in the captured images. The region extracting step extracts object region by comparing background image with object image in reference to the detected edges.

Preferably, the edge detecting step includes following steps. First step samples an N×N image, calculates average and variation regarding the sampled image, and obtains statistical feature of the image. Second step extracts candidate edge pixels among all pixels in the image, brightness of the candidate edge pixels being significantly different from brightness of adjacent pixels. Third step connects candidate edge pixels extracted at the second step. Fourth step stores the candidate edge pixels as final edge pixels if length of the connected pixels is longer than threshold length or stores the candidate edge pixels as non-edge pixels if length of the connected pixels is shorter than threshold length.

Preferably, the second step detects maximum value and minimum value among differences between brightness of current pixel and brightness of eight adjacent pixels, classifies the current pixel as into a non-edge pixel if the maximum value and the minimum value are smaller than threshold value, and classifies the current pixel as into an edge pixel if the maximum value and the minimum value are bigger than threshold value, the threshold value being determined by statistical feature of the image.

Preferably, the third step determines magnitude and direction of an edge by applying Sobel operator to the candidate edge pixels, classifies the edge pixel whose magnitude and direction are determined into a non-edge pixel if magnitude of the edge pixel is smaller than magnitude of other candidate edge pixels, and connects remaining candidate edge pixels with adjacent candidate edge pixels.

Preferably, the feature extraction step includes line extracting step and feature point extracting means. The line extracting step extracts lines of an object from result of the image processing step. The feature point extracting step extracts crossing points of an object by finding intersection points of the extracted lines.

Preferably, the volume measurement step includes matched junction capturing step, three dimensional model generating step, and volume calculating step. The matched junction capturing step matches same crossing points among crossing points captured from the image. The three dimensional model generating step generates three dimensional model of an object on the basis of the matched junction captured at the matched junction capturing step. The volume calculating step calculates volume of the object on the basis of the three dimensional model.

Preferably, the volume measurement step further includes error minimizing step for compensating error of the three dimensional model generated by the three dimensional model generating step.

Preferably, the matched junction capturing step captures matched junction by utilizing crossing points of the object captured in the image and epipolar geometry.

An automatic parcel volume capture method implemented in a computer system is provided. An automatic parcel volume capture method implemented in a computer system in accordance with an embodiment of the present invention includes stereo image input step, image processing step, feature extraction step, and volume measurement step. The stereo image input step captures images of an object from at least two different angles. The image processing step performs signal-processing on the images captured at the stereo image input step and extracts region of object in the images. The feature extraction step extracts lines and crossing points of the lines from results of the image processing step. The volume measurement step generates three dimensional model on the basis of the extracted images and measures volume of the object.

BRIEF DESCRIPTION OF THE DRAWINGS

The embodiments of the present invention will be explained with reference to the accompanying drawings, in which.

DETAILED DESCRIPTION OF THE INVENTION

Figure 1:
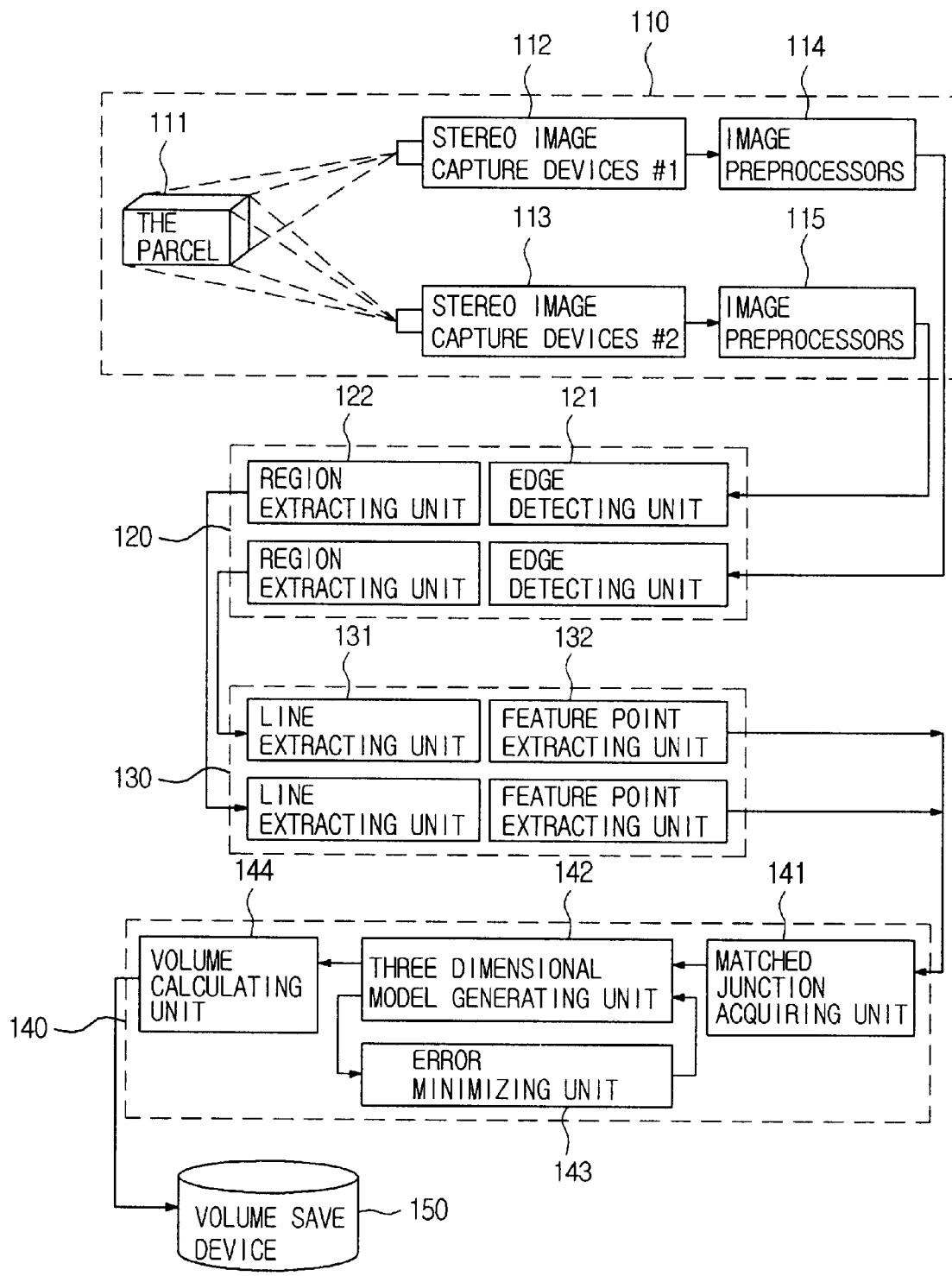
FIG. 1 is a diagram illustrating an automatic parcel volume capture system in accordance with an embodiment of the present invention.

FIG. 1 is a diagram illustrating an automatic parcel volume capture system in accordance with an embodiment of the present invention.

As shown in FIG. 1, the automatic parcel volume capture system in accordance with an embodiment of the present invention includes input image device 110, image processing device 120, feature extraction device 130, volume measure device 140, and volume save device 150. The input image device 110 receives an image of an object and removes shadow and noise. The image processing device 120 performs edge detection and extracts region of the object from the input image. The feature extraction device 130 extracts feature from the image resulted from the image processing device 120. The volume measure device 140 measures volume of the parcel and the volume save device 150 stores volume of the measured parcel.

The input image device 110 includes two stereo image capture devices 112 and 113 and two image preprocessors 114 and 115. The two image preprocessors 114 and 115 perform average operation on the captured image. If a stereo image is averaged, an image that is insensitive to lighting variation is obtained. CCD cameras may implement the stereo image capture devices 112 and 113.

Now, let's get into more details. The input image device 110 performs image capture process and image preprocessing process on the parcel 111. The parcel 111 is moved by a tray and stopped in front of the two stereo image capture devices 112 and 113 for a second. The first stereo image capture devices 112 and the second stereo image capture devices 113 generate a stereo image of the input image. The two image preprocessors 114 and 115 perform average operation on the stereo image and convert the image in order that captured image may be well recognized regardless of lighting of the photographing environment.

Figure 2:
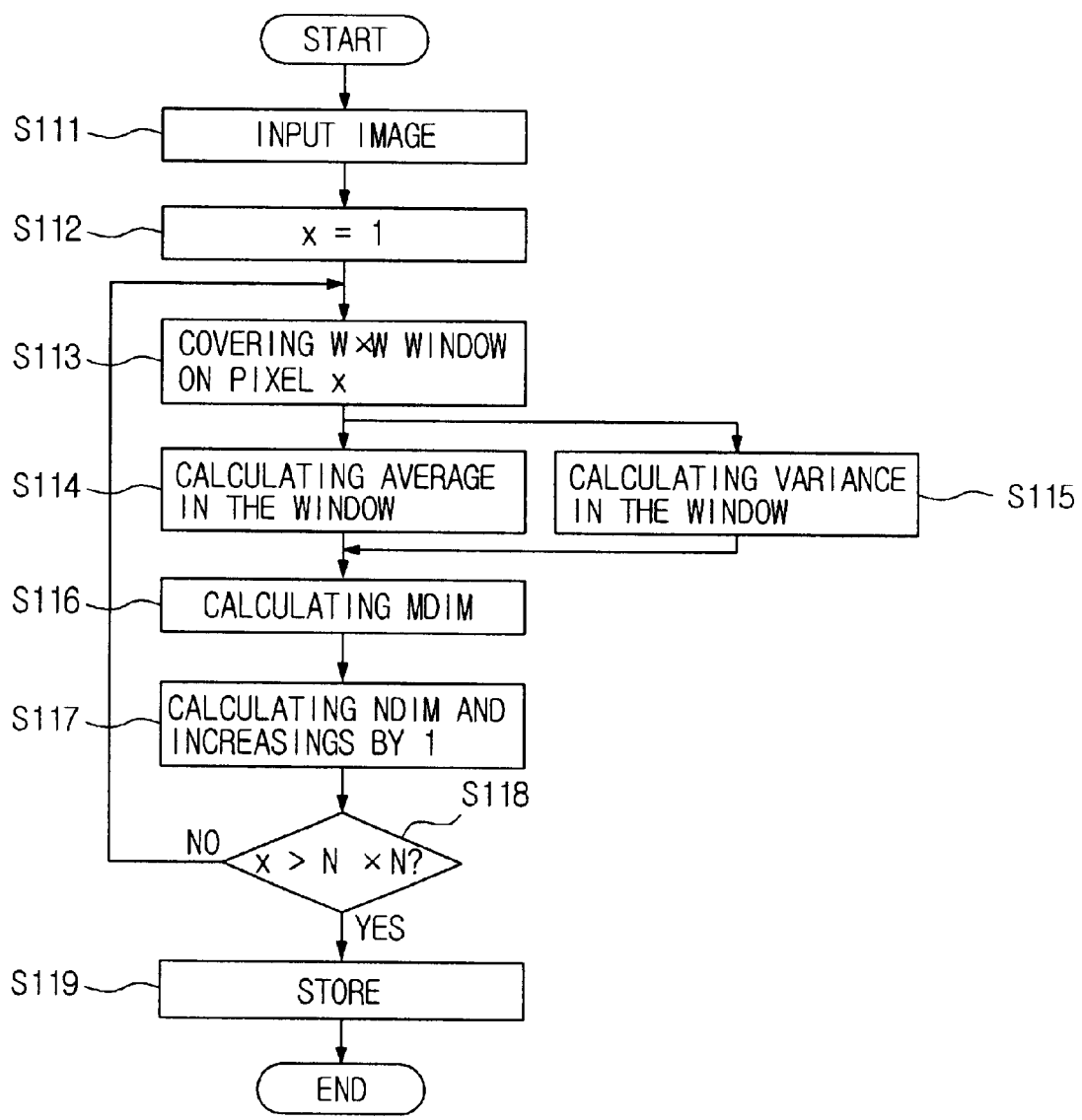
FIG. 2 is a flow diagram illustrating image preprocessing method of the automatic parcel volume capture system in accordance with an embodiment of the present invention.

FIG. 2 is a flow diagram illustrating image preprocessing method of the automatic parcel volume capture system in accordance with an embodiment of the present invention. Let's say that size of the parcel 111 is N×N and a variable x represents the current pixel. When an image is provided from the input image device 110 at step S111, following steps from S112 to S118 are executed as the current pixel x increases up to N×N sequentially.

First, a W×W window having center at pixel x is covered at step S113 and local average and variation for all pixels in the window are calculated at step S114 and S115. Using the calculated average and variation, an image based upon MDIM (Mean difference Dynamic Image Model) and an image based upon NDIM (Normalized Dynamic Image Model) are described and the current pixel x is increased by 1 at step S116 and S117. If the current pixel x is larger than N×N at step S118, MDIM is stored at S119. If the current pixel x is not lager than N×N at step S118, the step S113 is executed.

Equation 1 describes MDIM in which local average is removed.

$$I_{m2}(x+\delta x)=\alpha(x) \cdot I_{m1}(x), \text{ where } I_{mi}(x)=I_i(x)-m_i(x) \quad \text{[Equation 1]}$$

x: position of the current pixel $I_i(x)$: brightness of x $\alpha(x)$: local brightness changing component $m_1(x)$: local average of x $I_{mi}(x)$: difference between brightness of x $I_i(x)$ and local average of x $m_i(x)$ $$I_{ms2}(x+\delta x)=I_{ms1}(x), \text{ where } I_{msi}(x)=(I_i(x)-m_i(x))/S_1(x) \quad \text{[Equation 2]}$$

$S_1(x)$: square value of the local variation $I_{msi}(x)$: $I_{mi}(x)$ divided by $S_i(x)$ The image processing device 120 includes an edge detecting unit 121 and an region extracting unit 122. The edge detecting unit 121 and the region extracting unit 122 detect edge of the object provided from the image preprocessors 114 and 115 and extracts region of the object. The edge detecting unit 121 utilizes statistical techniques for edge detection. The statistical techniques are advantageous because they are robust against external environmental lighting variation. In order to expedite edge detection, candidate edge pixels are estimated and magnitude and direction of the candidate edge pixels are determined. Detection for object region is performed by comparison between pre-stored background image and the image including the object.

Figure 3:
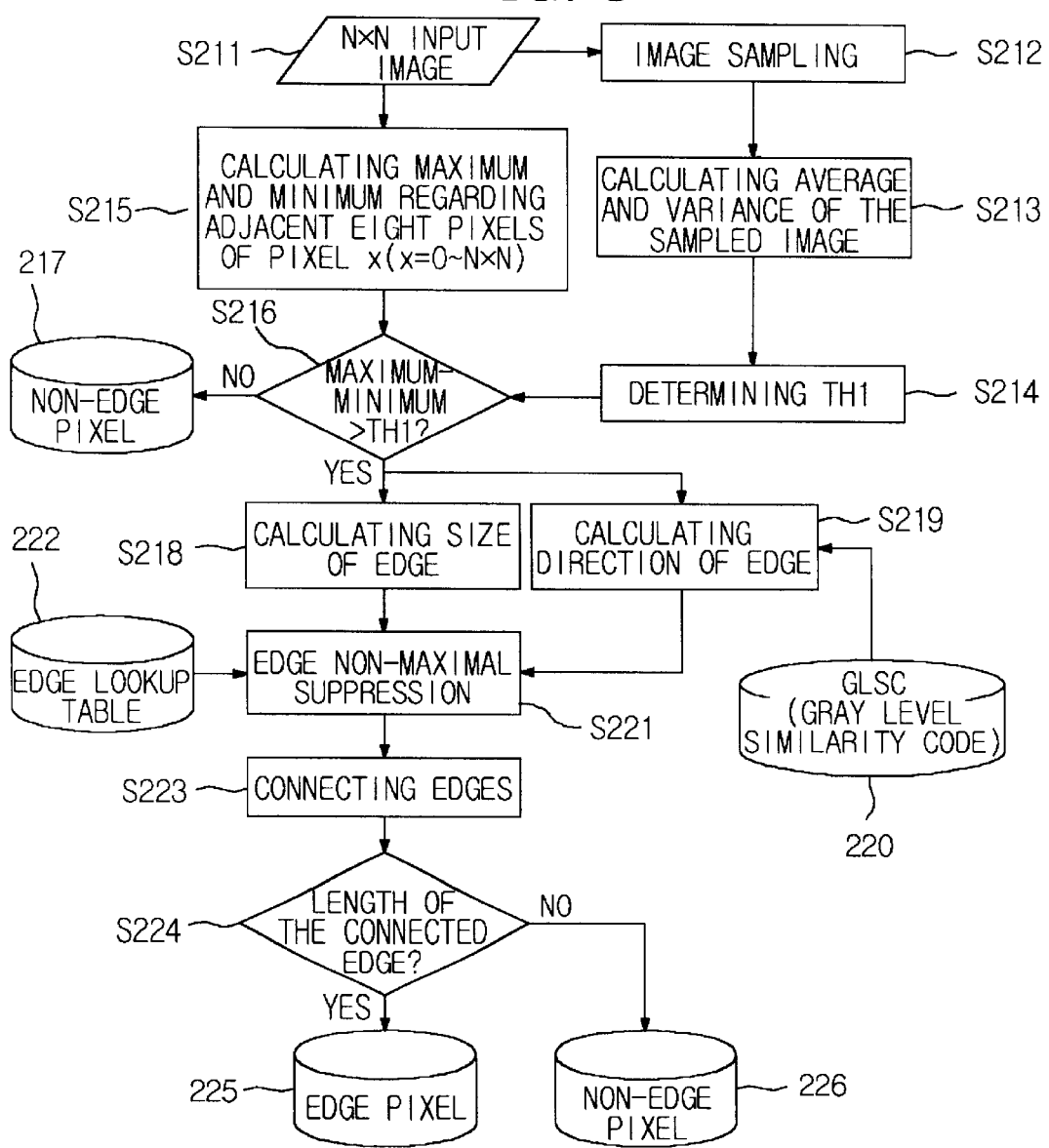
FIG. 3 is a flow diagram illustrating an edge detection method of image processing unit in accordance with an embodiment of the present invention.

FIG. 3 is a flow diagram illustrating an edge detection method of image processing unit in accordance with an embodiment of the present invention.

The edge detection method of image processing unit in accordance with an embodiment of the present invention includes a step for extracting feature statistically, a step for determining edge pixels and detecting edge pixels, and a step for connecting detected edge pixels and removing short edge pixels.

First, a N×N image is received at step S211 and sampling is performed on the image with a particular number of pixels at step S212. Average and variation are calculated for the sampled pixels at step S213. Then, average and variation of the sampled image are set as a statistical feature of the current image. Threshold value (Th1) are determined by utilizing the statistical feature at step S214.

Once the statistical feature is determined, candidate edge pixels are determined regarding all pixels of the input image. For this, maximum value and minimum value among differences between brightness of current pixel and brightness of eight adjacent pixels are detected at step S215 and the difference between the maximum value and the minimum value is compared with the threshold (Th1). As stated before, the threshold (Th1) is set by utilizing statistical feature of the input image.

If the difference between the maximum value and the minimum value is larger than the threshold (Th1) at step S216, the pixel is determined as a candidate edge pixel and step S218 and step S219 are executed. If the difference between the maximum value and the minimum value is smaller than the threshold (Th1) at step S216, the pixel is determined as a non-edge pixel and it is stored at non-edge pixel database 217.

If the pixel is determined as a candidate edge pixel, Sobel operator is used to determine magnitude and direction of the edge at step S218 and S219. At step S219, direction of the edge is described by GLSC (Gray Level Similarity Code) 220.

Once magnitude and direction are determined, edges whose direction is different from the adjacent edges are removed at step S221. Such processes are called Edge Non-maximal Suppression and edge lookup table 222 is used. Edge Non-maximal Suppression is an algorithm in which direction components of current edge pixels are compared with direction components of adjacent edge pixels. If they are not identical, adjacent edge pixels are removed. As a result of the algorithm, an image described by edge lines from a thick edge image is obtained.

Finally, remaining candidate edge pixels are connected at step S223. If length of the connected edge is bigger than threshold (Th2) at step S224, the pixel is determined as an edge pixel 225. If length of the connected edge is smaller than threshold (Th2) at step S224, the pixel is determined as a non-edge pixel 226. The pixels determined as edge pixels by these processes usually represent boundary of objects or backgrounds.

The feature extraction device 130 include a line extraction unit 131 and a feature point extraction unit 132. The line extraction unit 131 extracts lines from the result image of the image processing device 120. The feature point extraction unit 132 determines crossing point of the extracted lines as a feature point.

That is, the line extraction unit 131 utilizes parcel edges obtained from the image processing device 120 and extracts lines of the parcel. The feature point extraction unit 132 finds intersections of the extracted lines and extracts crossing points. Such feature extraction units compensate blurring effect and deterioration caused by shape distortion of the parcel.

The volume measure device 140 acquires matched junction from the two stereo images resulted from the feature extraction unit, generates three dimensional model, repeats error minimizing process, and measure volume of the object.

The volume measure device 140 integrates two images obtained by the two CCD cameras and calculates volume of the parcel. The volume measure device 140 includes matched junction acquiring unit 141, three dimensional model generating unit 142, error minimizing unit 143, and volume calculating unit 144 and calculated volume data is stored at the volume save device 150.

The matched junction acquiring unit 141 utilizes Epipolar geometry and feature points obtained by the feature extraction device 130 and acquires matched junctions of the two stereo images. The three dimensional model generating unit 142 utilizes the matched junctions of the two stereo images, estimates relative position of the parcel 111, and generates a three dimensional model. The three dimensional model is repeatedly applied to the error minimizing unit 143 and a precise three dimensional may be obtained through these processes. The volume calculating unit 144 utilizes the compensated three dimensional model and calculates exact volume of the parcel.

Figure 4:
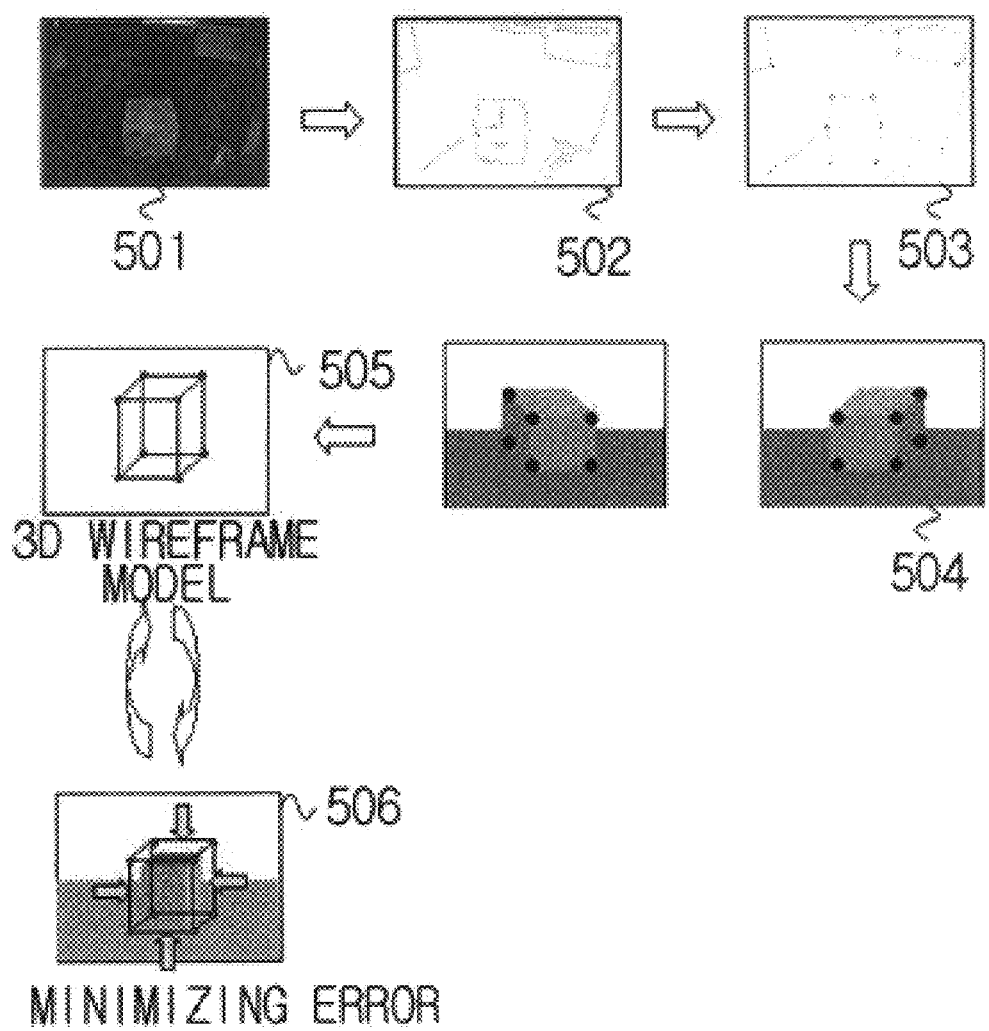
FIG. 4 is a flow diagram illustrating parcel image recognition step of of the automatic parcel volume capture system in accordance with an embodiment of the present invention.

FIG. 4 is a flow diagram illustrating parcel image recognition step of of the automatic parcel volume capture system in accordance with an embodiment of the present invention.

The input image device 110 detects parcel image using two CCD cameras, which is indicated by 501 in FIG. 4. The image processing device 120 detects edge and region of the parcel from result of the input image device 110, which is indicated by 502 in FIG. 4. The feature extraction device 130 extracts lines and crossing points from the result image of the image processing device 120, which is indicated by 503 in FIG. 4. The volume measure device 140 finds matched junction from the two result images of the feature extraction unit, which is indicated by 504 in FIG. 4 and generates three dimensional model, which is indicated by 505 in FIG. 4. The generated three dimensional model goes through the error minimizing process to become a precise three dimensional model, which is indicated by 506 in FIG. 4. The precise three dimensional model is used to calculate volume of the parcel and the calculated volume is stored into the volume save device 150.

Although representative embodiments of the present invention have been disclosed for illustrative purpose, those who are skilled in the art will appreciate that various modifications, additions and substitutions are possible without departing from the scope and spirit of the present invention as defined in the accompanying claims.

What we claim:

1. An automatic parcel volume capture system, comprising:
    stereo image input means for capturing images of an object from at least two different angles;
    image processing means for signal-processing the images captured by the stereo image input means and extracting a region of said object in the images;
    feature extraction means for extracting lines and cross points of the lines from results of the image processing means; and
    volume measurement means for generating a three dimensional model on the basis of the extracted lines and cross points and measuring the volume of the object, wherein the volume measurement means comprises:
        matched junction capturing means for matching the same crossing points among crossing points captured from the image;
        three dimensional model generating means for generating said three dimensional model of said object on the basis of the matched junction capturing means; and
        volume calculating means for calculating the volume of the object on the basis of the three dimensional model.

2. The automatic parcel volume capture system of claim 1, further comprising a volume storage means for storing volume of the object measured by the volume measurement means.

3. The automatic parcel volume capture system of claim 1, wherein the stereo image input means comprises:
    image capturing means for capturing images of the object from at least two different angles; and
    image preprocessing means for averaging the captured images and removing noises.

4. The automatic parcel volume capture system of claim 3, wherein the image capturing means is a charge coupled device (CCD) camera.

5. The automatic parcel volume capture system of claim 1, wherein the image processing means comprises:
    edge detecting means for detecting all edges in the captured images; and
    region extracting means for extracting said object region by comparing background image with said object image in reference to the detected edges.

6. The automatic parcel volume capture system of claim 1, wherein the feature extraction means comprises:
    line extracting means for extracting lines of said object from result of the image processing means; and
    feature point extracting means for extracting the crossing points of said object by finding intersection points of the extracted lines.

7. The automatic parcel volume capture system of claim 1, wherein the volume measurement means further comprises an error minimizing means for compensating the error of the three dimensional model generated by the three dimensional model generating means.

8. An automatic parcel volume capture method, comprising:
    a stereo image input step for capturing images of an object from at least two different angles;
    an image processing step for signal-processing the images captured at the stereo image input step and extracting a region of said object in the images;
    a feature extraction step for extracting lines and cross points of the lines from results of the image processing step; and
    a volume measurement step for generating a three dimensional model on the basis of the extracted lines and cross points and the volume of the object, wherein the volume measurement step comprises:
        a matched junction capturing step for matching the same crossing points among crossing points captured from the image;
        a three-dimensional model generating step for generating said three dimensional model of said object on the basis the matched junction capturing step; and
        a volume calculating step for calculating the volume of the object on the basis of the three dimensional model.

9. The automatic parcel volume capture method of claim 8, further comprising a volume storage step for storing the volume of the object measured by the volume measurement step.

10. The automatic parcel volume capture method of claim 8, wherein the stereo image input step comprises:
    an image capturing step for capturing images of the object from at least two different angles; and
    an image preprocessing step for averaging the captured images and removing noises.

11. The automatic parcel volume capture method of claim 10, wherein the image preprocessing step comprising:
    a first step for covering a W×W window around a current pixel x in N×N input image;
    a second step for calculating local average and variation regarding all pixels in the window;
    a third step for applying the average and the variation to the following equation 1 for MDIM (Mean difference Dynamic Image Model) and applying the average and the variation to the following equation 2 for NDIM (Normalized Dynamic Image Model); and a fourth step for repeating the first step to third step with increasing the current pixel x up to N×N sequentially;

$$I_{m2}(x+\delta x) = \alpha(x) \cdot I_{mi}(x), \text{ where } I_{m1}(x) = I_i(x) - m_i(x) \quad \text{[Equation 1]}$$

$$I_{ms2}(x+\delta x) = I_{ms1}(x), \text{ where } I_{msi}(x) = (I_i(x) - m_i(x))/S_1(x) \quad \text{[Equation 2]}$$

x: position of the current pixel $I_i(x)$: brightness of x $\alpha(x)$: local brightness changing component $S_1(x)$: square value of the local variation $m_i(x)$: local average of x $\overline{I_{mi}(x)}$: difference between brightness of x $I_i(x)$ and local average of x $m_i(x)$ $I_{msi}(x)$: $I_{mi}(x)$ divided by $S_i(x)$.

12. The automatic parcel volume capture method of claim 8, wherein the image processing step comprises:
an edge detecting step for detecting all edges in the captured images; and
a region extracting step for extracting said object region by comparing background image with said object image in reference to the detected edges.

13. The automatic parcel volume capture method of claim 12, wherein the edge detecting step comprises:
a first step for sampling an N×N image, calculating an average and a variation regarding the image, and obtaining statistical feature of the image;
a second step for extracting a candidate edge pixels among all pixels in the image, a brightness of the candidate edge pixels being significantly different from brightness of the adjacent pixels;
a third step for connecting the candidate edge pixels extracted at the second step; and
a fourth step for storing the candidate edge pixels as final edge pixels if length of the connected pixels is longer than threshold length and storing the candidate edge pixels as non-edge pixels if length of the connected pixels is shorter than threshold length.

14. The automatic parcel volume capture method of claim 13, wherein the second step detects maximum value and minimum value among differences between the brightness of current pixel and the brightness of eight adjacent pixels, classifies the current pixel as into a non-edge pixel if the maximum value and the minimum value are smaller than threshold value, and classifies the current pixel as into an edge pixel if the maximum value and the minimum value are bigger than threshold value, the threshold value being determined by statistical feature of the image.

15. The automatic parcel volume capture method of claim 13, wherein the third step determines a magnitude and a direction of an edge by applying Sobel operator to the candidate edge pixels, classifies the edge pixel whose said magnitude and said direction are determined into a non-edge pixel if said magnitude of the edge pixel is smaller than said magnitude of other candidate edge pixels, and connects remaining candidate edge pixels with adjacent candidate edge pixels.

16. The automatic parcel volume capture method of claim 8, wherein the feature extraction step comprises:
a line extracting step for extracting lines of said object from result of the image processing step; and
a feature point extracting step for extracting the crossing points of said object by finding intersection points of the extracted lines.

17. The automatic parcel volume capture method of claim 8, wherein the volume measurement step further comprises an error minimizing step for compensating the error of the three dimensional model generated by the three dimensional model generating step.

18. The automatic parcel volume capture method of claim 8, wherein the matched junction capturing step captures matched junction by utilizing the crossing points of the object captured in the image and an epipolar geometry.

19. An automatic parcel volume capture method implemented in a computer system, comprising:
a stereo image input step for capturing images of an object from at least two different angles;
an image processing step for signal-processing the images captured at the stereo image input step and extracting a region of said object in the images;
a feature extraction step for extracting lines and cross points of the lines from results of the image processing step; and
a volume measurement step for generating a three dimensional model on the basis of the extracted lines and cross points and measuring the volume of the object, wherein the volume measurement step comprises:
a matched junction capturing step for matching the same crossing points among crossing points captured from the image;
a three-dimensional model generating step for generating said three dimensional model of said object on the basis of the matched junction capturing step; and
a volume calculating step for calculating the volume of the object on the basis of the three dimensional model.

* * * * *